US012167390B2

(12) United States Patent
Ye et al.

(10) Patent No.: US 12,167,390 B2
(45) Date of Patent: Dec. 10, 2024

(54) HARQ DESIGN FOR WIRELESS COMMUNICATIONS

(71) Applicant: Apple Inc., Cupertino, CA (US)

(72) Inventors: Sigen Ye, Whitehouse Station, NJ (US); Oghenekome Oteri, San Diego, CA (US); Seyed Ali Akbar Fakoorian, San Diego, CA (US); Chunxuan Ye, San Diego, CA (US); Dawei Zhang, Saratoga, CA (US); Hong He, San Jose, CA (US); Huaning Niu, San Jose, CA (US); Wei Zeng, Saratoga, CA (US); Weidong Yang, San Diego, CA (US); Wenshu Zhang, San Diego, CA (US); Yinghui Li, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 364 days.

(21) Appl. No.: 17/741,739

(22) Filed: May 11, 2022

(65) Prior Publication Data
US 2023/0371021 A1 Nov. 16, 2023

Related U.S. Application Data

(60) Provisional application No. 63/187,353, filed on May 11, 2021.

(51) Int. Cl.
| | |
|---|---|
| *H04L 1/1607* | (2023.01) |
| *H04L 1/1812* | (2023.01) |
| *H04L 5/00* | (2006.01) |
| *H04W 72/0446* | (2023.01) |
| *H04W 72/1268* | (2023.01) |
| *H04W 72/23* | (2023.01) |

(52) U.S. Cl.
CPC ....... *H04W 72/1268* (2013.01); *H04L 1/1812* (2013.01); *H04L 5/0053* (2013.01); *H04W 72/0446* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2022/0240289 A1* | 7/2022 | Karaki | ................ | H04L 1/1896 |
| 2022/0330234 A1* | 10/2022 | Yang | .................... | H04W 72/56 |
| 2022/0353023 A1* | 11/2022 | Guthmann | ............ | H04L 1/1861 |

(Continued)

FOREIGN PATENT DOCUMENTS

| | | | | |
|---|---|---|---|---|
| WO | WO-2021159857 A1 * | 8/2021 | ......... | H04L 1/1607 |
| WO | WO-2022155102 A1 * | 7/2022 | ......... | H04L 1/1614 |

*Primary Examiner* — Ajit Patel
(74) *Attorney, Agent, or Firm* — Womble Bond Dickinson (US) LLP

(57) ABSTRACT

Disclosed are methods and apparatus for multiplexing of uplink control information on uplink data channels in wireless communication. It may be determined that transmission of a plurality of physical uplink shared channels (PUSCHs) are scheduled. The transmission of the plurality of PUSCHs may overlap with transmission of an uplink control information (UCI). At most one of the plurality of PUSCHs on to which the UCI is multiplexed may be determined based on a Downlink Assignment Index (DAI) value. The plurality of PUSCHs may be set with no more than one PUSCH having the DAI value not equal to four. Thereafter, the determined PUSCH is transmitted with the UCI multiplexed on it.

20 Claims, 16 Drawing Sheets

(56) References Cited

U.S. PATENT DOCUMENTS

| | | | |
|---|---|---|---|
| 2022/0361214 A1* | 11/2022 | Hosseini | H04L 1/1854 |
| 2023/0232394 A1* | 7/2023 | Yuan | H04L 5/0044 |
| | | | 370/329 |
| 2024/0049211 A1* | 2/2024 | Eriksson | H04W 72/12 |
| 2024/0097830 A1* | 3/2024 | Hooli | H04L 1/1854 |
| 2024/0196426 A1* | 6/2024 | Gao | H04L 5/0064 |
| 2024/0236975 A1* | 7/2024 | Yoshioka | H04L 1/1854 |
| 2024/0250782 A1* | 7/2024 | Yoshioka | H04L 1/1887 |

* cited by examiner

HARQ DESIGN FOR WIRELESS COMMUNICATIONS

RELATED APPLICATION

The present application is a continuation of and claims benefit under 35 USC 119(e) of U.S. Provisional Patent Application No. 63/187,353 filed May 11, 2021, which is incorporated by reference in its entirety.

FIELD OF INVENTION

This invention relates generally to the field of wireless communication, and more particularly, to methods and apparatus for multiplexing uplink control information on uplink data channels in wireless communication devices.

BACKGROUND OF THE INVENTION

In New Radio (NR) Rel-15, multiple Physical Uplink Shared Channels (PUSCHs) overlapping with a Physical Uplink Control Channel (PUCCH) often occurs in carrier aggregation (CA). An uplink control information (UCI) may be multiplexed on one of the PUSCHs based on predefined rules. The UCI may be carried by either the PUCCH or the PUSCH depending on situation. The UCI may carry Hybrid Automatic Repeat Request-Acknowledgement (HARQ-ACK/NAK), Scheduling Request (SR), or Channel State Information (CSI). To address the issue of missing downlink (DL) Downlink Control Information (DCI), fields called Counter-Downlink Assignment Index (C-DAI) and Total-Downlink Assignment Index (T-DAI) can be included in DL DCI formats to inform the User Equipment (UE) how many bits of Hybrid Automatic Repeat Request-Acknowledgement (HARQ-ACK) that can be generated until this DCI and until the end of the monitoring occasion, respectively. A field called T-DAI can be included in DCI Format 0_1 or 0_2 to inform the UE how many bits of HARQ-ACK should be included when UCI is multiplexed on this PUSCH. Note that currently when DAI field has 2 bits, DAI value of 4 may be used to indicate either 0 HARQ-ACK bit or 4*n HARQ-ACK bits (i.e., a multiple of 4), which may cause confusion in some cases.

However, Rel-15 UCI multiplexing behavior may create ambiguity between the gNodeB (gNB) and the UE in terms of which PUSCH has UCI multiplexed on it. When there is ambiguity between the gNB and the UE, the UCI may not be correctly decoded by the gNB. Moreover, the ambiguity between the gNB and the UE creates complexity for PUSCH decoding at the gNB. Since the gNB does not know which PUSCH actually has UCI multiplexed, the gNB may need to perform double decoding for a PUSCH, assuming UCI is multiplexed on it and UCI is not multiplexed on it. In the worst case, the double decoding would be needed for all the overlapping PUSCHs. Thus, there is a need for a mechanism that minimizes the UE implementation complexity and the ambiguity between gNB and UE in terms of which PUSCH has UCI multiplexed when there are multiple PUSCHs overlapping with PUCCH, thereby improving the UCI and PUSCH decoding.

SUMMARY OF THE DESCRIPTION

Methods and systems to multiplex uplink control information on uplink data channels are disclosed. A baseband processor of a wireless user equipment (UE) configured to perform operations may include determining that transmission of a plurality of physical uplink shared channels (PUSCH) are scheduled. The transmission of the plurality of PUSCHs may overlap with transmission of an uplink control information (UCI). The operations may also include determining at most one of the plurality of PUSCHs on to which the UCI is multiplexed based on a Downlink Assignment Index (DAI) value. The plurality of PUSCHs may be set with no more than one PUSCH having the DAI value not equal to four. Further, the operations may include transmitting the determined PUSCH with the UCI multiplexed on it.

In some embodiments, the operations may further include determining that the PUSCH is scheduled by a downlink control information (DCI) format with the DAI value not equal to four; multiplexing a Hybrid Automatic Repeat Request-Acknowledgement (HARQ-ACK) on the PUSCH; and determining a codebook size of the HARQ-ACK based on the DAI value.

In another disclosed embodiment, the operations may further include determining a presence of the DAI value for each of the plurality of overlapping PUSCHs; and determining that each of the PUSCHs having the DAI value equal to four or no corresponding DAI.

In one disclosed embodiment, the operations may further include determining that the plurality of PUSCHs overlap with a PUCCH with a HARQ-ACK; selecting one of the plurality of PUSCHs according to a plurality of predefined rules; multiplexing the HARQ-ACK on the PUSCH; and determining a codebook size of the HARQ-ACK based on the DAI value.

In one disclosed embodiment, the operations may further include determining that the plurality of PUSCHs are not overlapped with a PUCCH with a HARQ-ACK and not multiplexing the HARQ-ACK on any of the PUSCHs.

In another embodiment, the operations may further include determining that all the PUSCHs have an uplink (UL)-Total DAI (TDAI) equal to four and there is an overlapping PUCCH with a downlink (DL)-Counter DAI (cDAI) equals uplink (UL)-Total DAI (TDAI); selecting one of plurality of PUSCHs according to a plurality of predefined rules; multiplexing the HARQ-ACK on the selected PUSCH; and determining a codebook size of the HARQ-ACK based on the DAI value.

In an embodiment, the operations may further include determining a HARQ-ACK codebook based on a codebook constructed for the slot; and dropping the PUCCH for the HARQ-ACK in the slot.

According to an embodiment of the present disclosure, the slot comprises no more than one PUCCH with the HARQ-ACK.

In an embodiment, the operations may further include determining that the plurality of PUSCHs do not have a corresponding DAI value; determining that the PUSCHs are overlapped with a PUCCH with the HARQ-ACK; selecting one of the plurality of PUSCHs s according to the plurality of predefined rules; and multiplexing the HARQ-ACK on the selected PUSCH.

In yet another disclosed embodiment, the operations may further include determining whether there is at least one PUSCH with a corresponding DAI value and at least one PUSCH without a corresponding DAI value; determining whether there is an overlapping PUCCH; selecting one of the plurality of PUSCHs according to the plurality of the predefined rules; and multiplexing the HARQ-ACK on the selected PUSCH.

In some embodiments, the operations may further include multiplexing the HARQ-ACK on the PUSCH when the PUSCH does not have a corresponding DAI value.

In a further disclosed embodiment, the operations may further include multiplexing the HARQ-ACK on the PUSCH when the PUSCH has a corresponding UL-TAI and if UL-TDAI is not equal to four or DL-cDAI equals UL-TDAI.

In some embodiments, the operations may further include multiplexing the HARQ-ACK on the PUSCH with a corresponding T-DAI value when the T-DAI value not equal to four.

According to another aspect, the above operations can be implemented in a user equipment (UE) device including at least one antenna, at least one radio, and at least one processor coupled to the at least one radio. The at least one radio may be configured to communicate with a second UE of a communication network using the at least one antenna. The at least one processor may be configured to perform operations of the above method.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
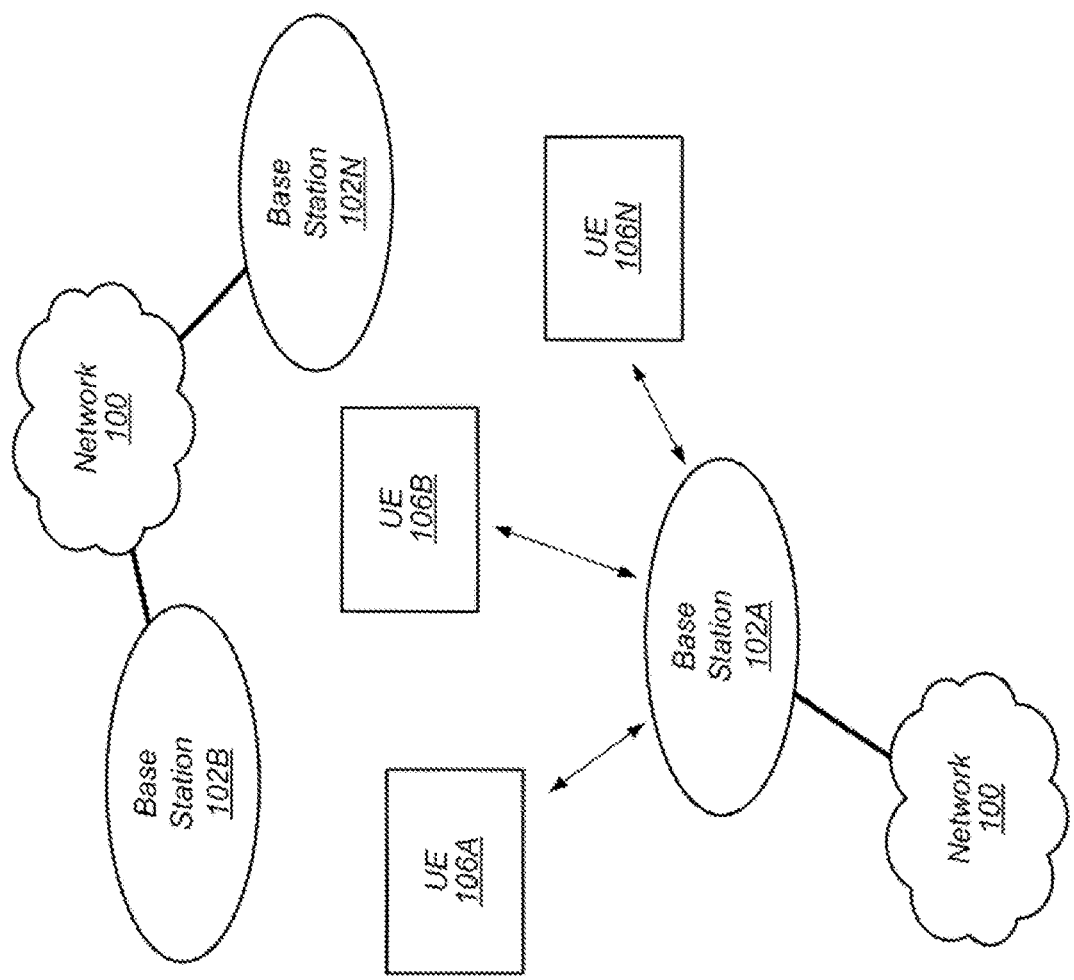
FIG. 1 illustrates an example wireless communication system according to one aspect of the disclosure.

Methods and apparatus for multiplexing uplink control information on uplink data channels in wireless communication devices are disclosed. When implemented, these methods and apparatus may provide mechanisms that avoid or minimize the ambiguity between gNB and UE in terms of which PUSCH has UCI multiplexed when there are multiple PUSCHs overlapping with PUCCH. As a result, the gNB has the same understanding as the UE on which PUSCH has UCI multiplexed, even if the UE has missed one or more UL DCIs and/or there is UL skipping.

In some embodiments, UE behaviors are defined based on the assumption that if the UE is dynamically scheduled with more than 1 overlapping PUSCHs, no more than one PUSCH has DAI not equal to four. In some embodiments, UE behaviors are defined based on the assumption that if the UE is dynamically scheduled with more than 1 PUSCHs in a slot, no more than one PUSCH has DAI not equal to four.

In one embodiment, the UE can be configured to follow the DAI indication in the UL grant. In some embodiments, an explicit indication can be introduced in UL DCI on whether there is UCI multiplexed on a PUSCH or not. In some other embodiments, an indication (e.g. as part of UCI) that is transmitted together with each PUSCH can be introduced to indicate whether there is UCI multiplexed on it or not.

When there are multiple overlapping PUSCHs without overlapping PUCCH, the UE selects one PUSCH to multiplex on based on pre-determined rules to avoid the UE complexity to multiplex UCI on multiple PUSCHs simultaneously. Note that the descriptions assume slot-based HARQ-ACK feedback. In case sub-slot-based HARQ-ACK feedback is used, the solutions can be easily extended.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

FIG. 1 illustrates a simplified example wireless communication system according to one aspect of the disclosure. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternatively be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
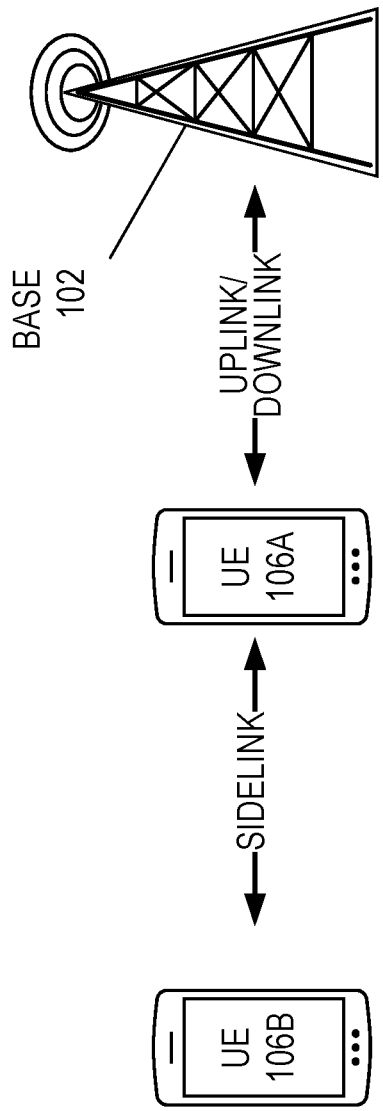
FIG. 2 illustrates user equipment 106A and 106B that can be in direct communication with each other (also known as device to device or sidelink) according to one aspect of the disclosure.

FIG. 2 illustrates user equipment 106A and 106B that can be in direct communication with each other (also known as device to device or sidelink). Sidelink communication can utilize dedicated sidelink channels and sidelink protocols to facilitate communication directly between devices. For example, physical sidelink control channel (PSCCH) can be used for actual data transmission between the devices, physical sidelink shared channel (PSSCH) can be used for conveying sidelink control information (SCI), physical sidelink feedback channel (PSFCH) can be used for HARQ feedback information, and physical sidelink broadcast channel (PSBCH) can be used for synchronization. Additional details are discussed in other sections.

In addition, sidelink communications can be used for communications between vehicles to vehicles (V2V), vehicle to infrastructure (V2I), vehicle to people (V2P), vehicle to network (V2N), and other types of direct communications.

UE 106A can also be in communication with a base station 102 in through uplink and downlink communications, according to some embodiments. The UEs may each be a device with cellular communication capability such as a mobile phone, a hand-held device, a computer or a tablet, or virtually any type of wireless device. The UEs 106A-B may include a processor that is configured to execute program instructions stored in memory. The UEs 106A-B may perform any of the method embodiments described herein by executing such stored instructions. Alternatively, or in addition, the UEs 106A-B may include a programmable hardware element such as an FPGA (field-programmable gate array) that is configured to perform any of the method embodiments described herein, or any portion of any of the method embodiments described herein.

The UEs 106A-B may include one or more antennas for communicating using one or more wireless communication protocols or technologies. In some embodiments, the UEs 106A-B may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UEs 106A-B may share one or more parts of a receive and/or transmit chain between multiple wireless communication technologies, such as those discussed above.

In some embodiments, the UEs 106A-B may include separate transmit and/or receive chains (e.g., including separate antennas and other radio components) for each wireless communication protocol with which it is configured to communicate. As a further possibility, the UEs 106A-B may include one or more radios which are shared between multiple wireless communication protocols, and one or more radios which are used exclusively by a single wireless communication protocol. For example, the UE 106A-B might include a shared radio for communicating using either of LTE or 5G NR (or LTE or 1×RTT or LTE or GSM), and separate radios for communicating using each of Wi-Fi and Bluetooth. Other configurations are also possible.

Figure 3:
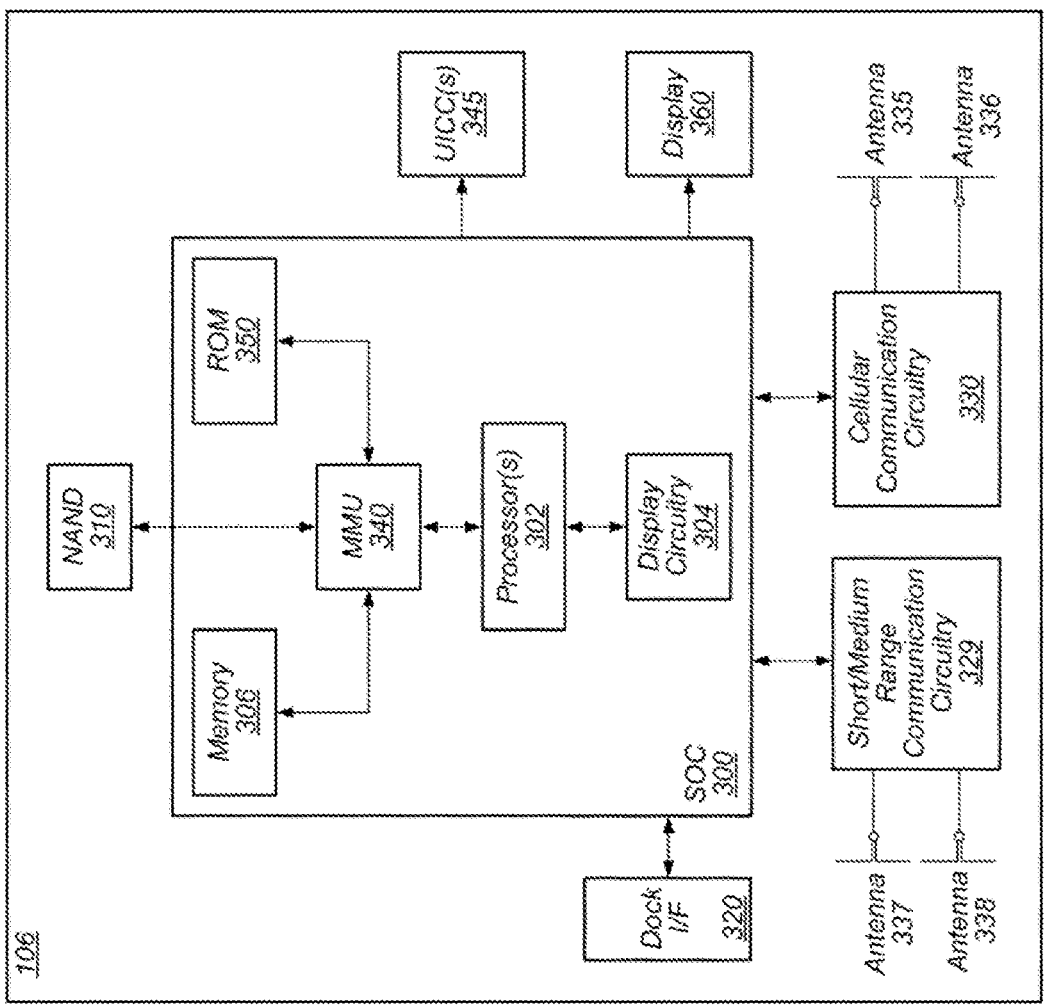
FIG. 3 illustrates an example block diagram of a UE according to one aspect of the disclosure.

FIG. 3 illustrates an example simplified block diagram of a communication device 106 according to one aspect of the disclosure. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition), the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
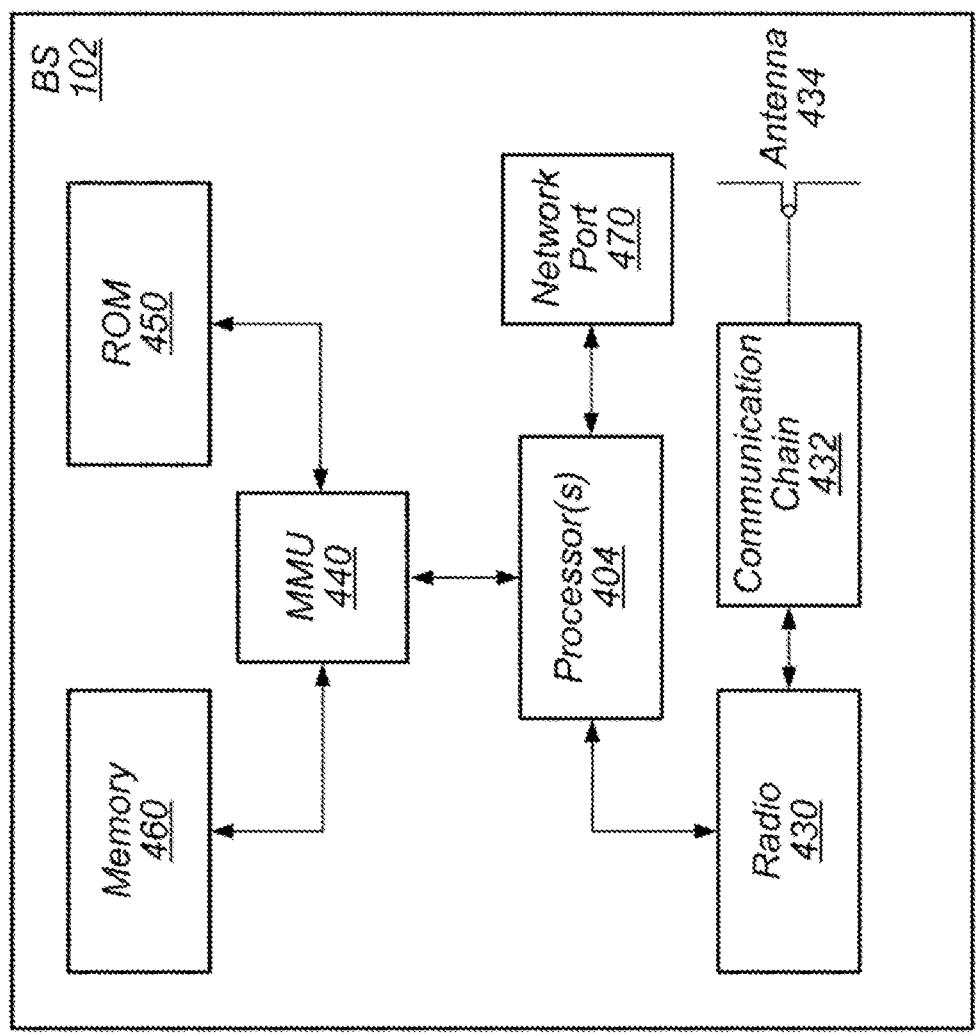
FIG. 4 illustrates an example block diagram of a BS according to one aspect of the disclosure.

FIG. 4 illustrates an example block diagram of a base station 102 according to one aspect of the disclosure. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
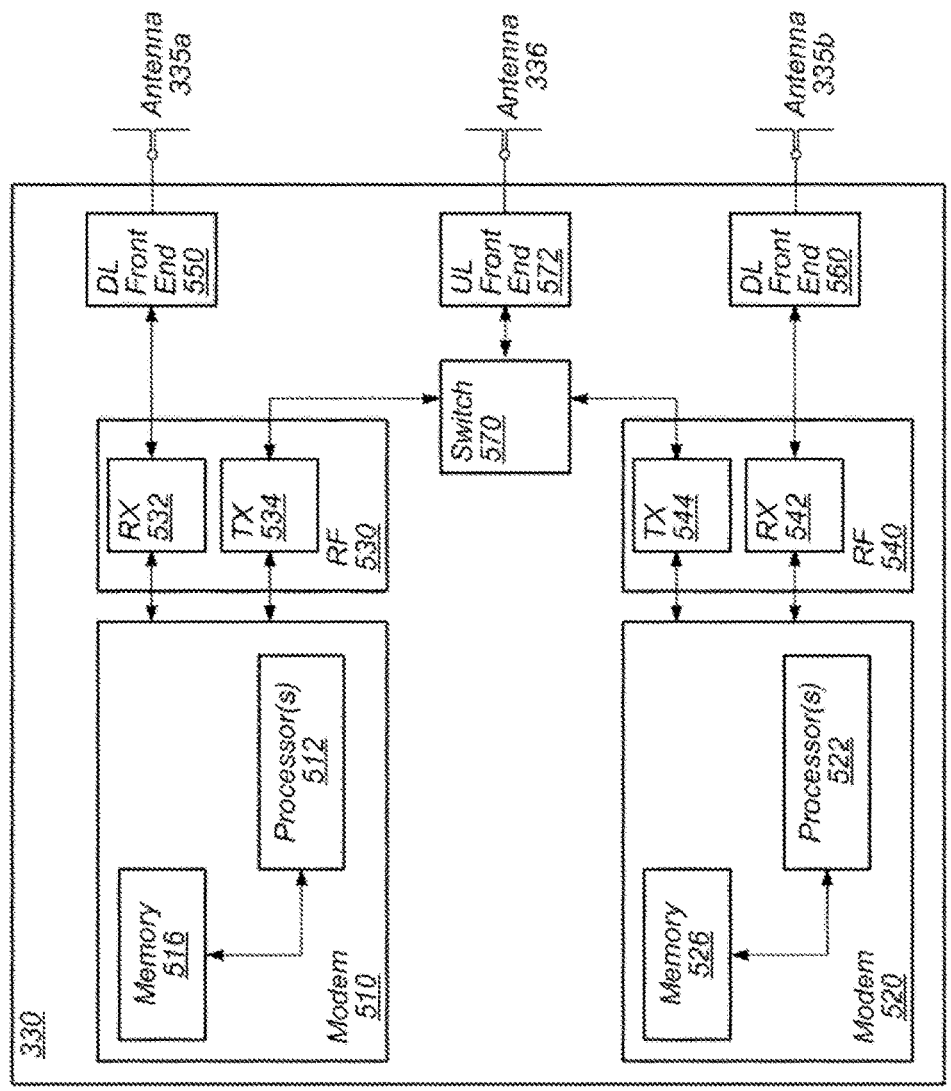
FIG. 5 illustrates an example block diagram of cellular communication circuitry according to one aspect of the disclosure.

FIG. 5 illustrates an example simplified block diagram of cellular communication circuitry according to one aspect of the disclosure. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for selecting a periodic resource part for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition), the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for selecting a periodic resource on a wireless link between a UE and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition), the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

In the following description, DCI format 0_0 and DCI format 0_1 may be used extensively to provide an explanation of the embodiments. However, the embodiments may not be limited to these DCI formats. They can be generalized to represent PUSCH without a corresponding T-DAI value or PUSCH with a corresponding T-DAI value, respectively.

Figure 6:
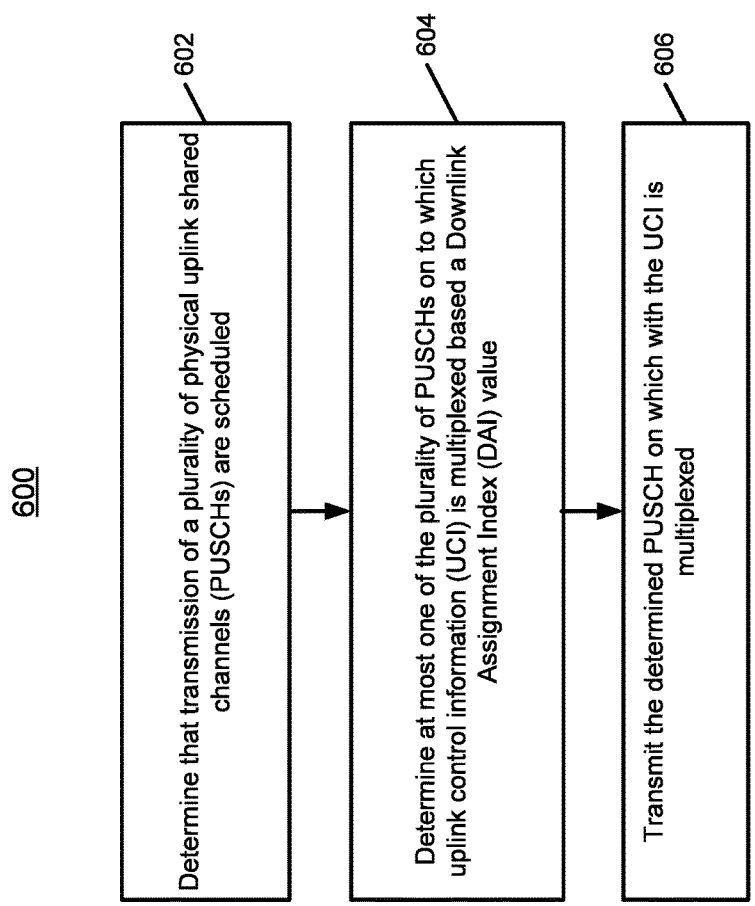
FIG. 6 depicts a flow diagram of a method for multiplexing of uplink control information on uplink data channels in wireless communication according to one aspect of the disclosure.

FIG. 6 is a flow diagram illustrating a method 600 for multiplexing of uplink control information on uplink data channels in wireless communication according to some embodiments. Process 600 may be performed by processing logic which may include software, hardware, or a combination thereof. Referring to FIG. 6, in operation 602, a UE may determine that transmission of a plurality of physical uplink shared channel (PUSCH) are scheduled. The transmission of the plurality of PUSCHs may overlap with transmission of an uplink control information (UCI). In operation 604, the UE may determine at most one of the plurality of PUSCHs on to which the UCI is multiplexed based on a Downlink Assignment Index (DAI) values. The plurality of PUSCHs may be set with no more than one PUSCH having a DAI value not equal to four. In operation 606, the UE may transmit the PUSCH with the UCI multiplexed on it, and the remaining PUSCHs without UCI multiplexed.

UE behaviors may be defined based on the assumption that if the UE is dynamically scheduled with more than one overlapping Physical Uplink Shared Channels (PUSCHs), no more than one PUSCH has a Downlink Assignment Index (DAI) not equal to four. Note that some of the PUSCHs (e.g., PUSCH is scheduled by a Downlink Control Information (DCI) format 0_0, or a configured grant PUSCH) may not have the corresponding DAI value.

Figure 7A:
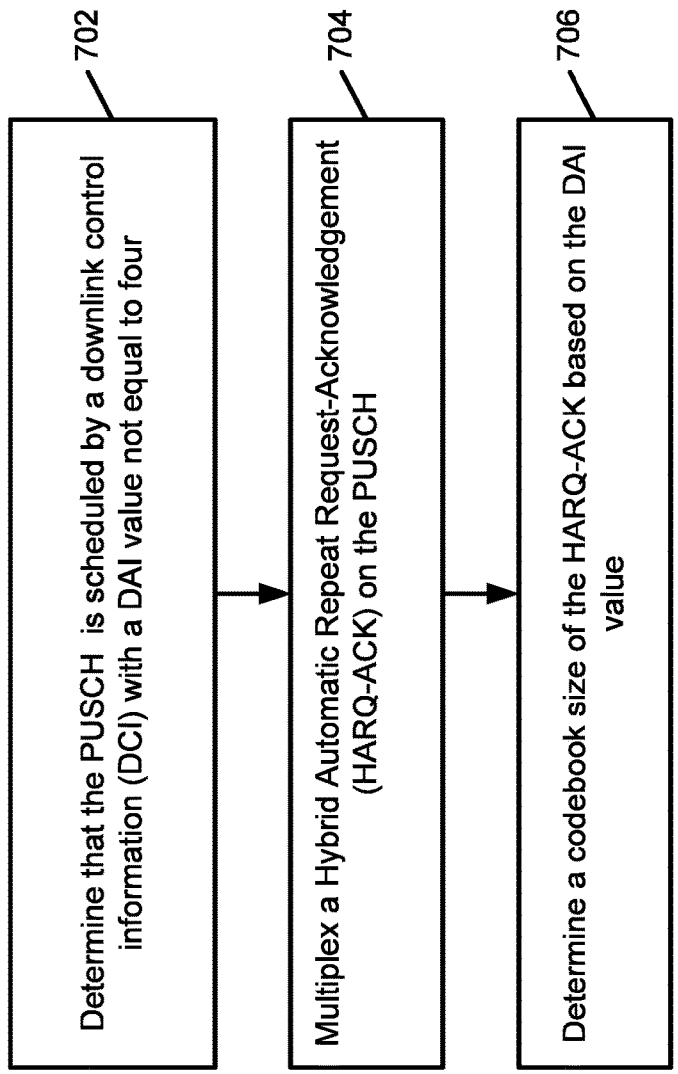
FIG. 7A depicts a flow diagram of a method for multiplexing of uplink control information on uplink data channels in wireless communication according to one aspect of the disclosure.

FIG. 7A depicts a flow diagram of a method for multiplexing of uplink control information on uplink data channels in wireless communication according to one aspect of the disclosure. Referring to FIG. 7A, in operation 702, when there are one or more overlapping PUSCHs, a UE may determine that a PUSCH is scheduled by a downlink control information (DCI) format (e.g. DCI format 0_1) with the DAI value not equal to four. In operation 704, the UE may multiplex a Hybrid Automatic Repeat Request-Acknowledgement (HARQ-ACK) on the PUSCH. In operation 706, the UE may determine a codebook size of the HARQ-ACK based on the DAI value. The HARQ-ACK codebook may be determined based on the codebook constructed for the overlapping PUCCH with HARQ-ACK, if any.

Figure 7B:
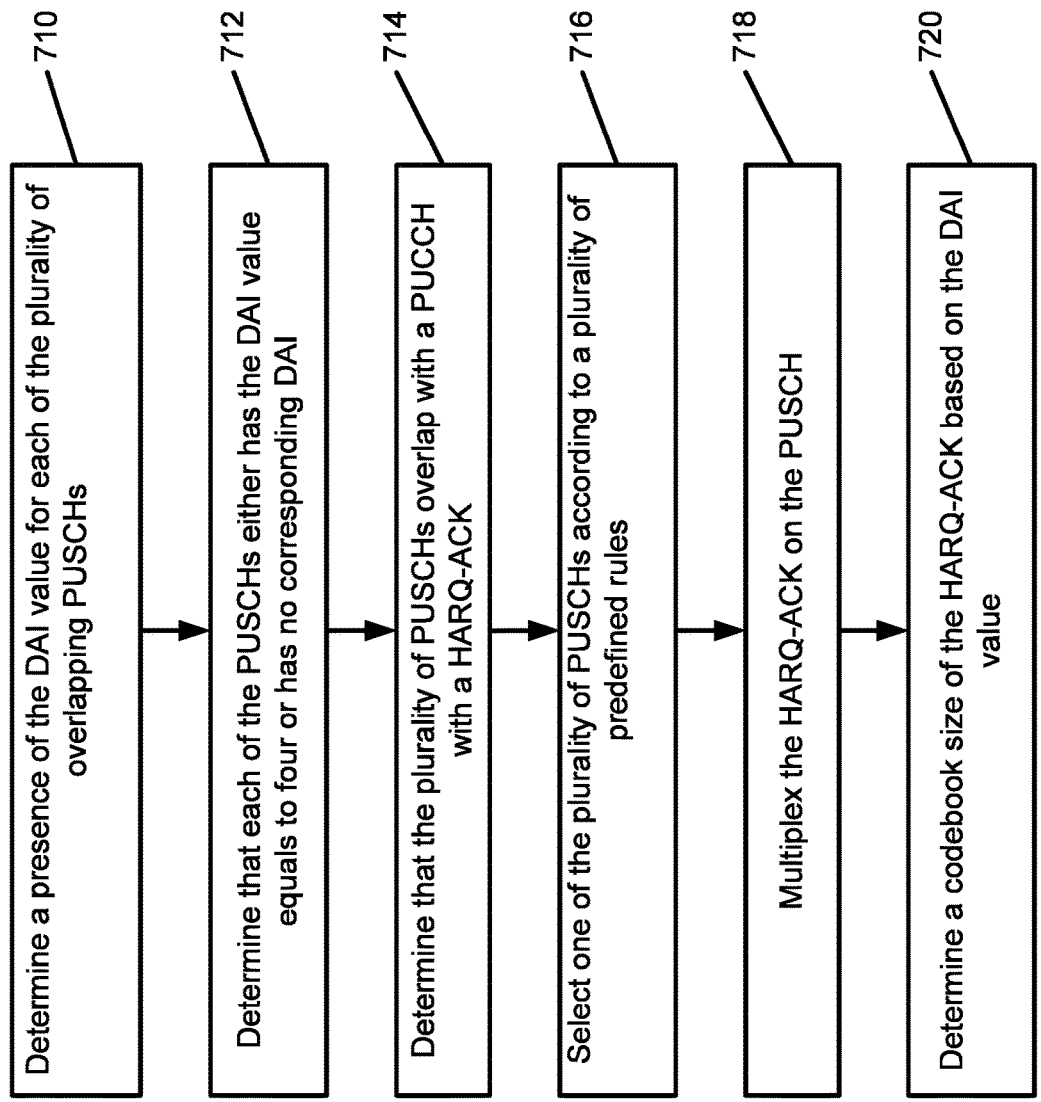
FIG. 7B depicts a flow diagram of a method for multiplexing of uplink control information on uplink data channels in wireless communication according to one aspect of the disclosure.

FIG. 7B depicts a flow diagram of a method for multiplexing of uplink control information on uplink data channels in wireless communication according to one aspect of the disclosure. Referring to FIG. 7B, in operation 710, the UE may determine a presence of the DAI value for each of the plurality of overlapping PUSCHs. In operation 712, the UE may determine that each of the plurality of overlapping PUSCHs either has no corresponding DAI value (e.g. PUSCH scheduled by DCI format 0_0 or configured grant PUSCH) or has DAI value equal to four. In operation 714, the UE may determine that the plurality of PUSCHs overlap with a PUCCH with HARQ-ACK. In operation 716, the UE may select one of the plurality of PUSCHs according to a plurality of predefined rules. In operation 718, the UE may multiplex the HARQ-ACK on the selected PUSCH. In operation 720, the UE may determine a codebook size of the HARQ-ACK based on the DAI value. The existing rules for choosing the PUSCH for UCI multiplexing can be reused.

In one embodiment, the UE may determine that the plurality of PUSCHs are not overlapped with a PUCCH with a HARQ-ACK. The UE may not multiplex the HARQ-ACK on any of the PUSCHs.

Figure 8:
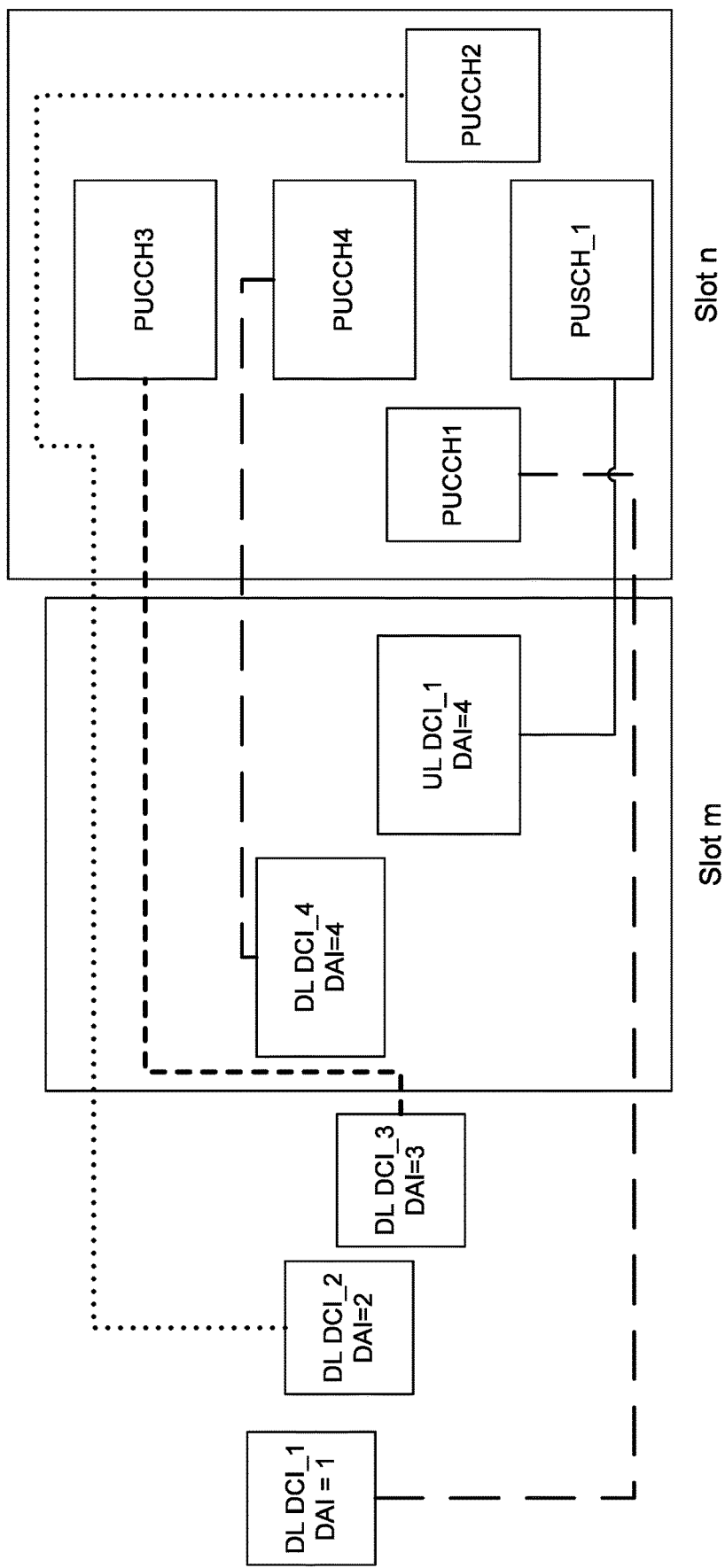
FIG. 8 depicts an example of operations for handling a missing DCI according to one aspect of the disclosure.

FIG. 8 shows an example of operations for handling a missing DCI according to one aspect of the disclosure. Even if the DL DCI_4 is missed by the UE, there may be no ambiguity between the gNB and the UE regarding the number of HARQ-ACK bits multiplexed on the PUSCH. For example, if there is a missing DCI (e.g., DL DCI_4), UE may see the overlapping PUCCH3 scheduled by DL DCI_3 and decide to multiplex HARQ-ACK on PUSCH1. The UE may use TDAI value in UL DCI_1 to construct 4 bit of HARQ-ACK, which is the same as what gNB expects.

In this embodiment, the UE relies on T-DAI to determine which PUSCH has UCI multiplexed on it. However, in the specification, a procedure has also been defined to choose one PUSCH out of multiple PUSCHs for the UCI multiplexing based on the Component Carrier (CC) index, starting time, etc. If both procedures are maintained, the gNB may ensure that these two approaches lead to the same outcome.

UE behaviors may be defined based on the assumption that if the UE is dynamically scheduled with more than 1 PUSCHs in a slot, no more than one PUSCH has DAI not equal to four. The assumption is based on the fact that only one PUCCH with HARQ-ACK may be supported in a slot. This means there should be at most one PUSCH with HARQ-ACK multiplexing in a slot.

If there are one or more PUSCHs in a slot, and one of them has DAI not equal to four, HARQ-ACK may be multiplexed on this PUSCH. The HARQ-ACK codebook size may be determined based on the DAI value. The HARQ-ACK codebook may be determined based on the codebook constructed for the slot, if any. The UE may drop the PUCCH for HARQ-ACK in the slot, if any, even if the PUCCH does not overlap with a PUSCH.

If there are one or more PUSCHs in a slot and all of them have DAI equal to four, and if there is a PUCCH overlapping with the PUSCH(s) with Downlink-counter Downlink Assignment Index (DL-cDAI) equals Uplink-Total Downlink Assignment Index (UL-TDAI), the UE may select one of the multiple PUSCHs according to the predefined rules and multiplex the HARQ-ACK on this PUSCH. The HARQ-ACK codebook size may be determined based on the DAI value. The existing rules for choosing the PUSCH for UCI multiplexing can be reused. Otherwise, the UE does not multiplex the HARQ-ACK on any of the PUSCHs. This means that multiplexing occurs only if the last DL DCI is not missed. In this embodiment, T-DAI may determine which PUSCH has the UCI multiplexed on it. However, in the specification, a procedure has also been defined to choose one PUSCH out of multiple PUSCHs for UCI multiplexing based on the CC index, starting time, etc. If both procedures are maintained, the gNB should ensure that these two approaches lead to the same outcome.

Figure 7C:
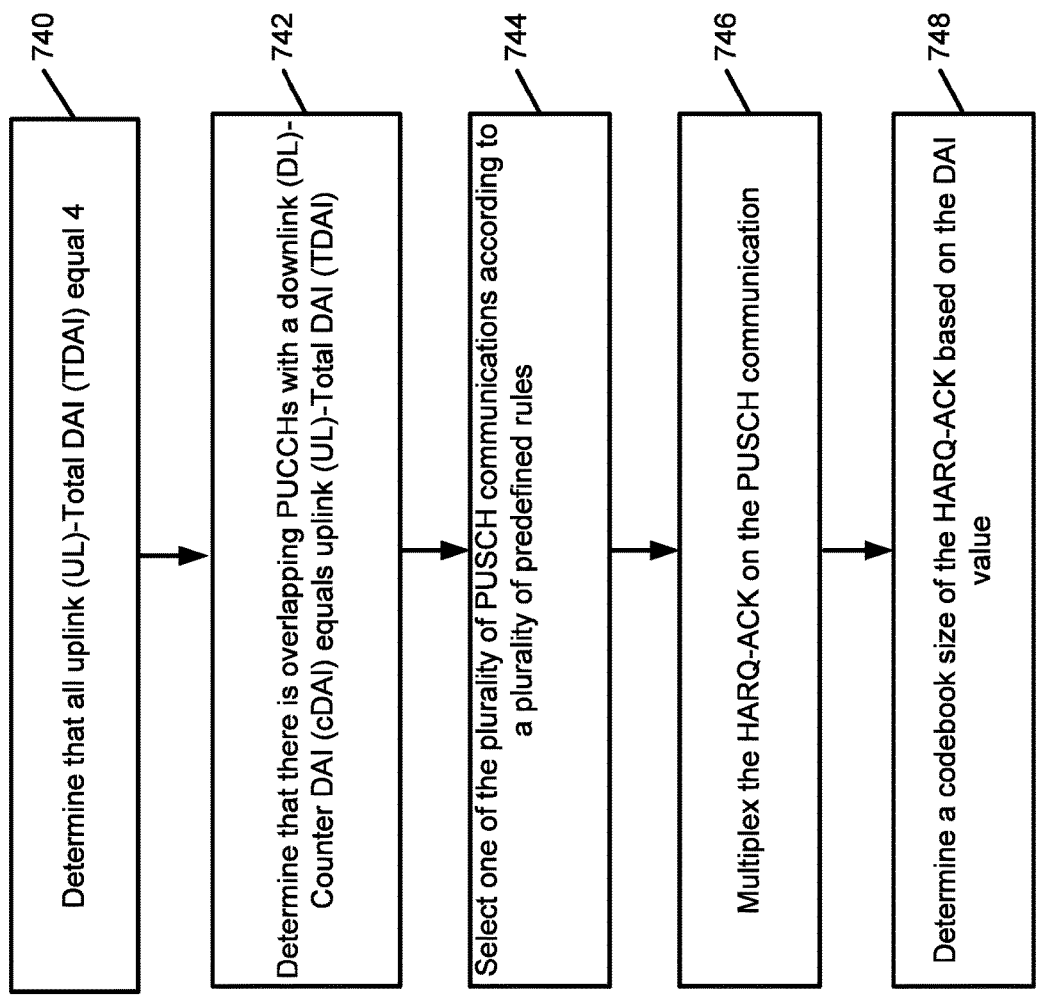
FIG. 7C depicts a flow diagram of a method for multiplexing of uplink control information on uplink data channels in wireless communication according to one aspect of the disclosure.

FIG. 7C is a flow diagram illustrating a method for multiplexing of uplink control information on uplink data channels according to some embodiments. The method may be performed by processing logic which may include software, hardware, or a combination thereof. Referring to FIG. 7C, in operation 740, a UE may determine that all uplink (UL)-Total DAI (T-DAI) equal 4. In operation 742, a UE may determine that there is overlapping PUCCHs with a downlink (DL)-Counter DAI (cDAI) equals uplink (UL)-Total DAI (TDAI). In operation 744, the UE may select one of the plurality of PUSCH communications according to a plurality of predefined rules. In operation 746, the UE may multiplex the HARQ-ACK on the PUSCH. In operation 748, the UE may determine a codebook size of the HARQ-ACK based on the DAI value.

In one embodiment, the UE may determine a HARQ-ACK codebook based on a codebook constructed for the slot. The UE may drop the PUCCH communication for the HARQ-ACK in the slot.

In one embodiment, the slot may include no more than one PUCCH communication with the HARQ-ACK.

In one embodiment, the UE may determine that the plurality of PUSCHs do not have a corresponding DAI value. The UE may determine that the PUSCHs are overlapped with a PUCCH with HARQ-ACK. The UE may select one of the plurality of PUSCHs according to the plurality of predefined rules. The UE may multiplex the HARQ-ACK on the selected PUSCH.

In one embodiment, the UE may determine whether there is at least one PUSCH with a corresponding DAI value and at least one PUSCH without a corresponding DAI value In one embodiment, the UE may determine that there is an overlapping PUCCH communication. The UE may select one of the plurality of PUSCHs according to the plurality of the predefined rules. The UE may multiplex the HARQ-ACK on the selected PUSCH.

In one embodiment, the UE may multiplex the HARQ-ACK on the PUSCH when the PUSCH does not have a corresponding DAI value.

In one embodiment, the UE may multiplex the HARQ-ACK on the PUSCH when the PUSCH has a corresponding UL-TAI and if UL-TDAI is not equal to four or DL-cDAI equals UL-TDAI.

In one embodiment, the UE may multiplex the HARQ-ACK on the PUSCH with a corresponding T-DAI value when the T-DAI value is not equal to four, and do not multiple the HARQ-ACK on any other PUSCH.

Figure 9:
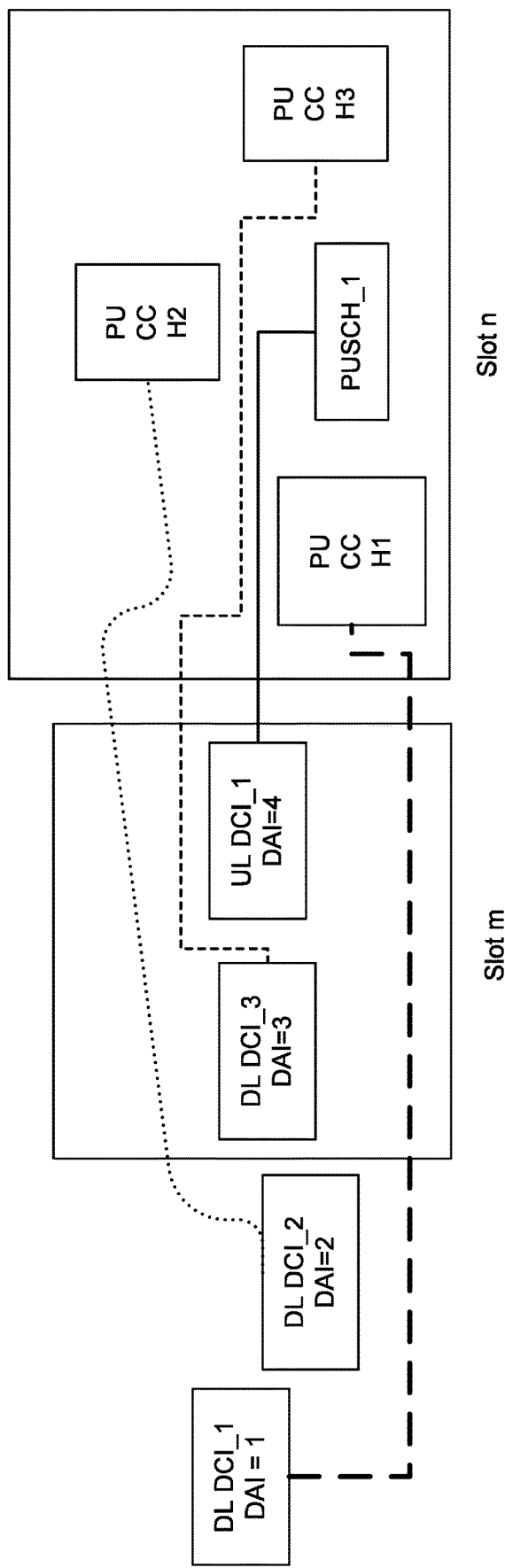
FIG. 9 depicts an example of operations for handling missing DCI according to one aspect of the disclosure.

FIG. 9 illustrates an example of operations for handling a missing DCI according to one aspect of the disclosure. DL DCI_3 is the last DL DCI, which occurs in a slot m. Final PUCCH3 (final decision by gNB) does not overlap with PUSCH1 so UL DCI_1 indicates t-DAI=4. This mean there is no multiplexing. If DC13 is missing, the UE only sees PUCCH2. However, the UE can check C-DAI value. Because C-DAI in DL DCI_2 and T-DAI value in UL DCI_1 do not match, so the UE does not do multiplexing, which is the same as what gNB expects.

Figure 10:
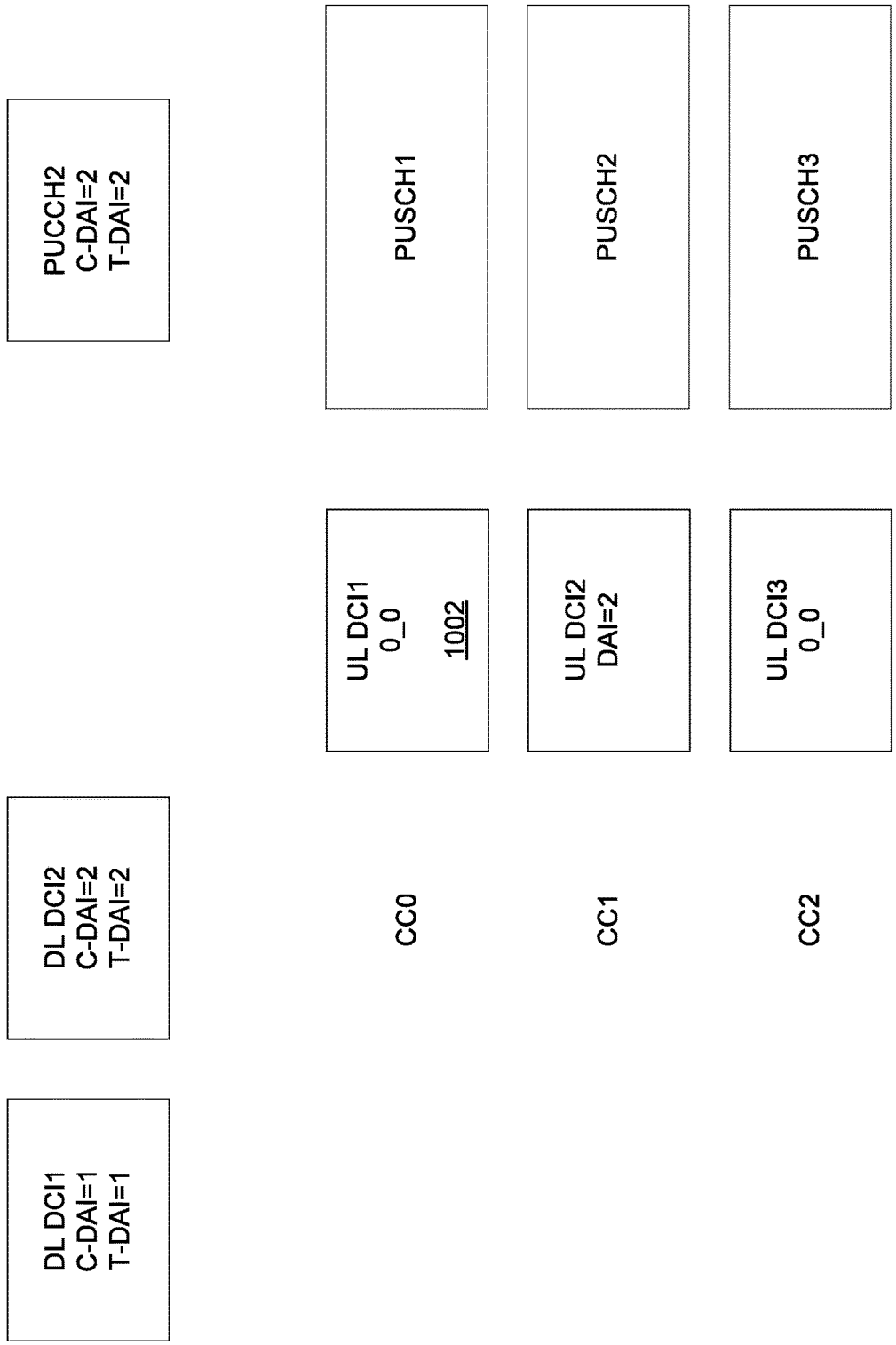
FIG. 10 depicts an example operation of handling of DCI format 0_0 according to one aspect of the disclosure.

FIG. 10 illustrates an example of handling of DCI format 0_0 according to an embodiment. Previously, the UE behavior is defined for the cases where T-DAI is present in the UL DCIs for all the PUSCHs. However, the UL DCI format 0_0 1002 does not have a T-DAI field, so the behavior corresponding to DCI format 0_0 also needs to be defined.

Regarding the UE behavior with the presence of DCI format 0_0, if all PUSCHs are scheduled by DCI format 0_0 1002 and if there is an overlapping PUCCH with HARQ-ACK, the UE may select one of the multiple PUSCHs according to the predefined rules (e.g., reusing the existing rules) and multiplex HARQ-ACK on this PUSCH.

For cases involving a mix of DCI format 0_0 and 0_1, if there is an overlapping PUCCH, the UE may select one of the multiple PUSCHs according to the predefined rules (e.g. reusing the existing rules). If the chosen PUSCH is scheduled by DCI format 0_0, the UE multiplexes HARQ-ACK on the PUSCH. If the chosen PUSCH is scheduled by DCI format 0_1, the UE multiplexes HARQ-ACK on this PUSCH if UL-TDAI is not equal to four or DL-cDAI equals UL-TDAI. Otherwise, the UE does not multiplex on any PUSCH. It may be specified that the UE does not expect any PUSCH other than the one chosen for UCI multiplexing to have a DAI value not equal to four if it is scheduled by DCI format 0_1.

If there is no overlapping PUCCH, there is no HARQ-ACK multiplexed on any of the PUSCHs scheduled by DCI format 0_0. HARQ-ACK is multiplexed on a PUSCH scheduled by DCI format 0_1 only if it has a T-DAI value not equal to four.

As an additional optimization, it may be further defined that if there is one PUSCH scheduled by 0_1 with DAI not equal to four, HARQ-ACK may be multiplexed on this PUSCH. Note that the behavior defined for DCI format 0_0 can also be used for a configured grant PUSCH, which does not have corresponding T-DAI value either.

In a case where there are multiple overlapping PUSCHs without an overlapping PUCCH, the following solution can be used to avoid the UE complexity to multiplex UCI on multiple PUSCHs simultaneously. In one embodiment, the UE selects one PUSCH to multiplex on based on predetermined rules. This can reuse the existing rules for selecting one PUSCH out of multiple PUSCHs that overlap with a PUCCH, that is, based on the CC index, starting time of PUSCHs, etc.

In one embodiment, the UE follows a T-DAI indication in the UL DCI to determine the number of HARQ-ACK bits to be multiplexed. In this manner, the UE may follow the T-DAI indication in UL DCI to determine the number of HARQ-ACK bits to be multiplexed. From UE perspective, this applies to every PUSCH, regardless of whether the PUSCH overlaps with a PUCCH carrying HARQ-ACK or not.

Figure 11:
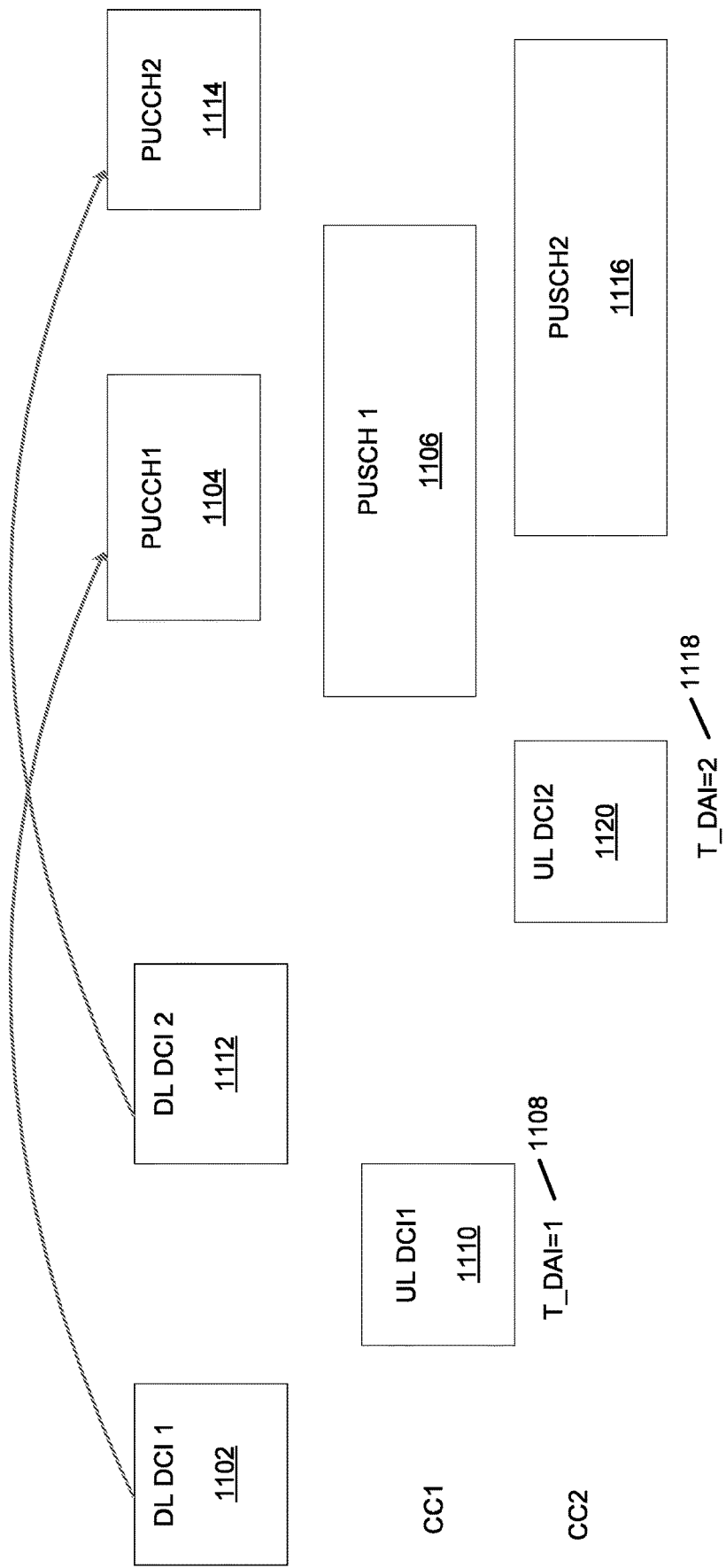
FIG. 11 depicts an example of scheduling decisions according to one aspect of the disclosure.

The gNB has the flexibility in configuring the T-DAI indication for each PUSCH. As one example, the gNB configures the same T-DAI value for all the overlapping PUSCHs. However, in cases when the gNB changes the scheduling decisions, the gNB may set T-DAI values differently for different PUSCHs. In the example below, the gNB makes different scheduling decisions sequentially in time:

FIG. 11 depicts an example of a scheduling decisions according to one aspect of the disclosure. In one embodiment, the gNB may schedule a PDSCH with a DL DCI 1 1102 which indicates PUCCH 1 1104 as the PUCCH resource carrying HARQ-ACK. In another embodiment, the gNB may schedule PUSCH 1 1106 and determine that UCI is to be multiplexed on PUSCH 1 1106. Thus, the gNB may set T-DAI equals 1 1108 in UL DCI 111. In some embodiments, the gNB may schedule another PDSCH with DL DCI 2 1112. Note that the gNB makes the decision to override the PUCCH resource to be PUCCH 2 1114 in the same slot given that the HARQ-ACK codebook size has increased. In one embodiment, the gNB may schedule PUSCH 2 1116 and determine that UCI is now to be multiplexed on PUSCH 2 1116. Thus, the gNB sets T-DAI=2 1118 in UL DCI 2 1120.

From UE perspective, the UE determines the HARQ-ACK payload size based on T-DAI in UL DCI 1 and UL DCI 2 for PUSCH 1 and PUSCH 2, respectively. For Type-1 HARQ-ACK codebook, the UE includes the HARQ-ACK codebook on a PUSCH if the corresponding T-DAI value is 1. Otherwise, the UE may not include the HARQ-ACK codebook. For Type-2 HARQ-ACK codebook, if there is overlapping PUCCH for HARQ-ACK, the UE may follow the existing procedure to determine the number of dynamic HARQ-ACK bits and multiplex HARQ-ACK on the PUSCH. In this example, the UE may multiplex 1 HARQ-ACK bit on PUSCH 1 (based on T-DAI=1) and multiplex 2 HARQ-ACK bits on PUSCH 2 (based on T-DAI=2).

Various embodiments may be implemented to determine which DL DCIs can be supported when generating HARQ-ACK codebook in terms of timing relative to the UL DCI. In one embodiment, the UE may consider all the DL DCIs that have been received for the PUCCH, even if the DL DCI arrives after the UL DCI for the PUSCH. Note that the multiplexing timeline should always be satisfied for the DL DCI.

In another embodiment, the UE may consider the DL DCIs that have been received for the PUCCH (if present) before the UL DCI for the PUSCH. This allows the UE to determine the number of HARQ-ACK bits once the UL DCI is received, which simplifies UE implementation.

If there is no overlapping PUCCH for HARQ-ACK, T-DAI may be used to determine the number of dynamic HARQ-ACK bits, and multiplex the HARQ-ACK on the PUSCH. If T-DAI value equals four, the UE does not multiplex HARQ-ACK on PUSCH. If the T-DAI value is not equal to four, the UE would include all Negative Acknowledgements (NACKs) for the HARQ-ACK payload.

Figure 12:
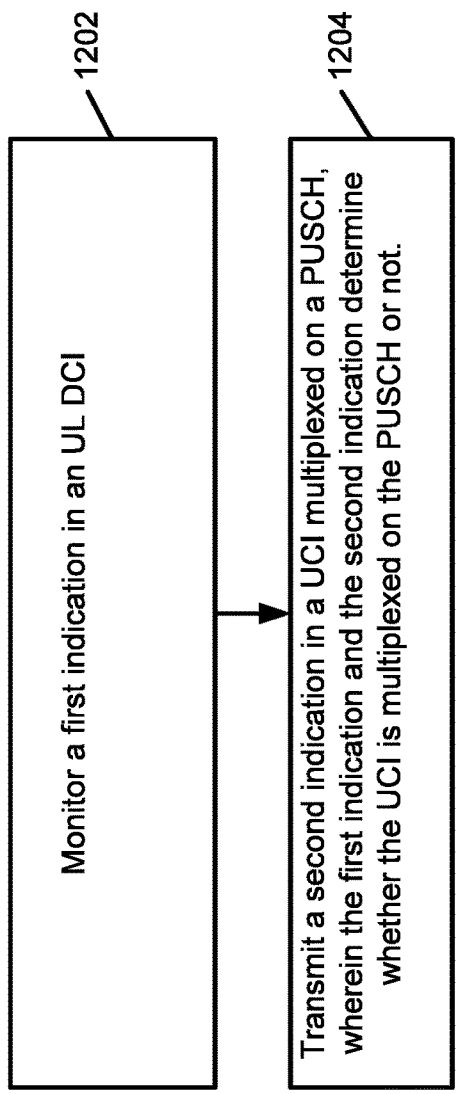
FIG. 12 depicts a flow diagram of a method for determining whether there is UCI multiplexed on a PUSCH or not according to one aspect of the disclosure.

FIG. 12 depicts a flow diagram of a method for determining whether there is UCI multiplexed on a PUSCH or not according to one aspect of the disclosure. Referring to FIG. 12, in operation 1202, a UE may monitor a first indication in an UL DCI. In operation 1204, the UE may transmit a second indication in a UCI multiplexed on a PUSCH, wherein the first indication and the second indication determine whether the UCI is multiplexed on the PUSCH or not.

Figure 13A:
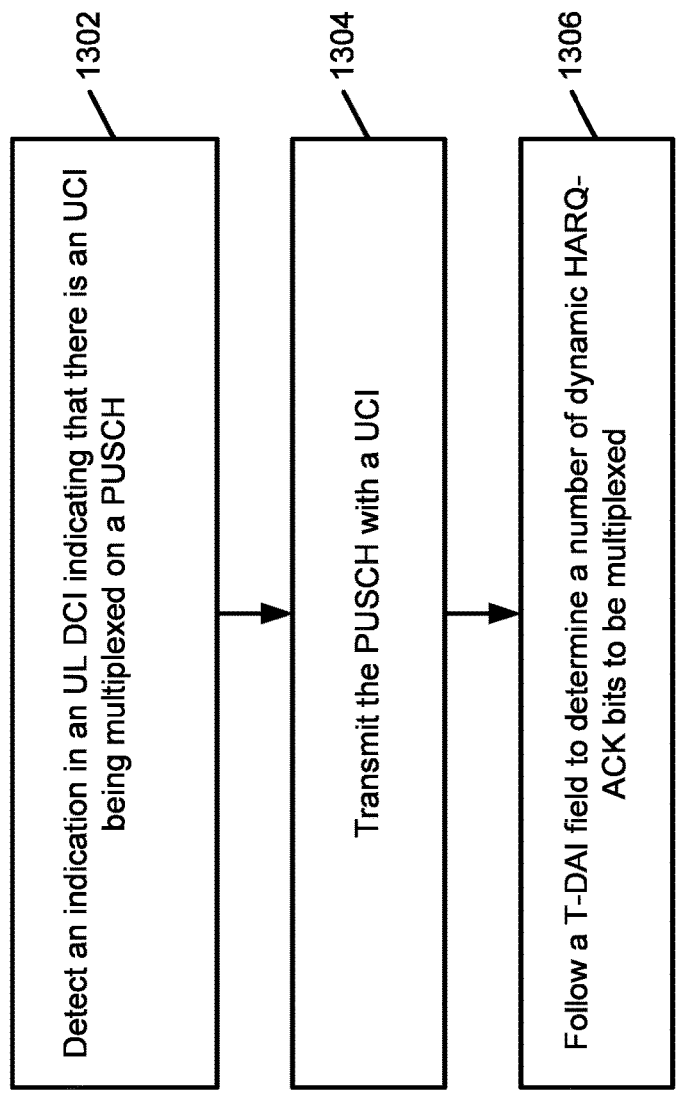
FIG. 13A depicts a flow diagram of a method for signaling an explicit indication in a UL DCI according to one aspect of the disclosure.

FIG. 13A flow diagram of a method for signaling an explicit indication in a UL DCI according to one aspect of the disclosure. Referring to FIG. 13A, in operation 1302, a UE may detect the first indication in the UL DCI indicating that there is an UCI being multiplexed on a PUSCH. In operation 1304, the UE may transmit the PUSCH with the UCI. In operation 1306, the UE may follow a T-DAI field to determine a number of dynamic HARQ-ACK bits to be multiplexed.

In one embodiment, an explicit indication in UL DCI can be implemented to indicate whether there is a UCI multiplexed on a PUSCH or not. In this manner, the UE follows the explicit indication to determine whether there is a UCI multiplexed on a PUSCH or not. If the explicit indication indicates no multiplexing, the UE transmits the PUSCH without any UCI. In another embodiment, if the explicit indication indicates multiplexing, the UE follows the T-DAI field to determine the number of dynamic HARQ-ACK bits to be multiplexed. The determination for Type 2 HARQ-ACK codebook can consider either all the DL DCIs or only the DL DCIs received before UL DCI. Note that the explicit indication may be used to cover all the UCIs and not just HARQ-ACK.

The explicit indication may be provided via signaling approaches. In one embodiment one state for the T-DAI field may indicate no-multiplexing. Currently, no dedicated state to indicate no HARQ-ACK multiplexing is available. T-DAI value of four can indicate either no HARQ-ACK bits or multiple of 4 HARQ-ACK bits. If the current 2-bit is reserved for T-DAI and one state for indicating no UCI multiplexing, three remaining states can indicate the number of HARQ-ACK bits. Alternatively, the bit-width for T-DAI can increase to 3 bits, for example. By reserving one state for no UCI multiplexing, 7 remaining states can indicate the number of HARQ-ACK bits. Some states can be reserved for future use if so many states are not needed for HARQ-ACK.

In another embodiment, the indication may be carried in a separate 1-bit field in DCI.

In a further embodiment, the multiplexing indication may include multiple bits to indicate which types of UCI and which physical layer priority of UCI are multiplexed on this PUSCH. For example, in the context of two physical layer priorities where low priority and high priority UCIs can be multiplexed together on a PUSCH, different states can indicate e.g. (1) only high priority HARQ-ACK is multiplexed on the PUSCH; (2) both low priority HARQ-ACK and high priority HARQ-ACK are multiplexed on the PUSCH; (3) both low priority HARQ-ACK/Scheduling Request (SR)/Channel State Information (CSI) and high priority HARQ-ACK/SR are multiplexed on the PUSCH; etc. This option requires the gNB to determines UCI multiplexing decision for a PUSCH when scheduling it. The gNB may have the flexibility to choose whether to multiplex the UCI on one or multiple PUSCHs. Alternatively, it can be restricted that there can be only one PUSCH with HARQ-ACK multiplexed among multiple overlapping PUSCHs, to simplify UE implementation.

In one embodiment, an indication (e.g. as part of UCI) can be transmitted together with each PUSCH to indicate whether there is UCI multiplexed on it or not. In this manner, the UE has full determination and the UE explicitly informs the gNB the outcome of the determination.

Figure 13B:
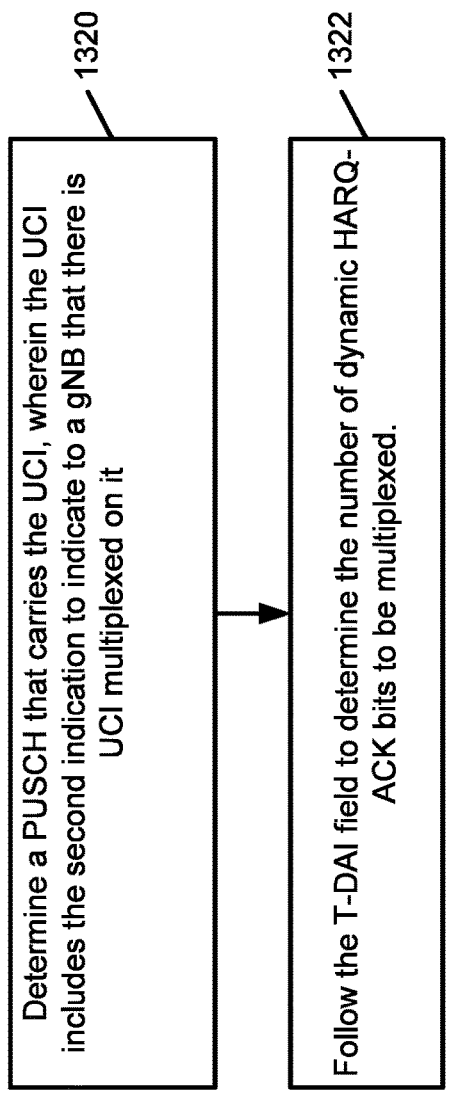
FIG. 13B depicts a flow diagram of a method for signaling an indication transmitted on a PUSCH according to one aspect of the disclosure.

FIG. 13B depicts a flow diagram of a method for signaling an indication transmitted on a PUSCH according to one aspect of the disclosure. Referring to FIG. 13B, in operation 1320, a UE may determine a PUSCH that carries the UCI, wherein the UCI includes the second indication to indicate to a gNB that there is UCI multiplexed on it. In operation 1322, the UE may follow the T-DAI field to determine the number of dynamic HARQ-ACK bits to be multiplexed.

In one embodiment, the UE may determine which PUSCH carries UCI. This can be implemented by either following a pre-defined procedure (e.g. Rel-15 procedure) or based on UE implementation. If a PUSCH carries UCI, the UE uses the indication to indicate to the gNB that there is UCI multiplexed. Otherwise, the UE indicates to the gNB that there is no UCI multiplexed. For the PUSCH that carries UCI, the UE determines the number of dynamic HARQ-ACK bits to be multiplexed based on the T-DAI field. Type 2 HARQ-ACK codebook can be determined based on either all the DL DCIs or only the DL DCIs received before UL DCI. Optionally, the UE may choose more than one overlapping PUSCHs to carry the UCI.

In one embodiment, the gNB may configure the T-DAI field properly for every PUSCH in case this PUSCH is selected for UCI multiplexing. The gNB may not be able to determine exactly which PUSCH would be selected by the UE to carry UCI (due to missing DL/UL DCIs and/or UL skipping). When decoding PUSCH, the gNB may first detect the indication to determine whether there is any UCI multiplexed on it. Based on this information, the gNB may determine the resource element (RE) mapping and can decode UCI and PUSCH properly.

The indication may be provided by the UE via signaling. In one embodiment, the UE may use a separate bit to indicate whether HARQ-ACK (and possibly other UCIs) is multiplexed on the PUSCH. In another embodiment, the multiplexing indication can be represented with multiple bits to indicate which types of UCI and which physical layer priority of UCI are multiplexed on this PUSCH.

The indication can be transmitted in a similar way as HARQ-ACK, reusing the existing procedure. If higher reliability is desirable for the new indication, a new parameter can be configured for the UE to determine the number of REs for the new indication. Alternatively, the indication can be achieved using different DMRS sequences. For example, one demodulation reference signals (DMRS) sequence may indicate there is UCI multiplexed, and another DMRS sequence may represent there is no UCI multiplexed.

There are a number of example embodiments described herein.

Example 1 is a baseband processor of a wireless equipment (UE) configured to perform operations comprising: determining that transmission of plurality of physical uplink shared channels (PUSCHs) are scheduled, wherein the transmission of the plurality of PUSCHs overlap with transmission of an uplink control information (UCI); determining at most one of the plurality of PUSCHs on to which the UCI is multiplexed based on a Downlink Assignment Index (DAI) value, wherein the plurality of PUSCHs are set with no more than one PUSCH having the DAI value not equal to four; and transmitting the determined PUSCH with the UCI multiplexed on it.

Example 2 is the baseband processor of example 1 that may optionally include that the operations further comprise: determining that the PUSCH is scheduled by a downlink control information (DCI) format with the DAI value not equal to four; multiplexing a Hybrid Automatic Repeat Request-Acknowledgement (HARQ-ACK) on the PUSCH; and determining a codebook size of the HARQ-ACK based on the DAI value.

Example 3 is the baseband processor of example 1 that may optionally include that the operations further comprise: determining a presence of the DAI value for each of the plurality of overlapping PUSCHs; determining that each of the PUSCHs having the DAI value equal to four or no corresponding DAI; determining that the plurality of PUSCHs overlap with a PUCCH with a HARQ-ACK; selecting one of the plurality of PUSCHs according to a plurality of predefined rules; multiplexing the HARQ-ACK on the PUSCH; and determining a codebook size of the HARQ-ACK based on the DAI value.

Example 4 is the baseband processor of example 3 that may optionally include that the operations further comprise: determining that the plurality of PUSCHs are not overlapped with a PUCCH with a HARQ-ACK; and not multiplexing the HARQ-ACK on any of the PUSCHs.

Example 5 is the baseband processor of example 1 that may optionally include that the operations further comprise: determining that all the PUSCHs have an uplink (UL)-Total DAI (TDAI) equal to four and there is an overlapping PUCCH with a downlink (DL)-Counter DAI (cDAI) equals uplink (UL)-Total DAI (TDAI); selecting one of the plurality of PUSCHs according to a plurality of predefined rules; multiplexing the HARQ-ACK on the selected PUSCH; and determining a codebook size of the HARQ-ACK based on the DAI value.

Example 6 is the baseband processor of example 5 that may optionally include that the operations further comprise: determining a HARQ-ACK codebook based on a codebook constructed for the slot; and dropping the PUCCH for the HARQ-ACK in the slot.

Example 7 is the baseband processor of example 5 that may optionally include that the slot comprises no more than one PUCCH with the HARQ-ACK.

Example 8 is the baseband processor of example 1 that may optionally include that the operations further comprise: determining that the plurality of PUSCHs do not have a corresponding DAI value; determining that the PUSCHs are overlapped with a PUCCH with the HARQ-ACK; selecting one of the plurality of PUSCHs s according to the plurality of predefined rules; and multiplexing the HARQ-ACK on the selected PUSCH.

Example 9 is the baseband processor of example 1 that may optionally include that the operations further comprise: determining whether there is at least one PUSCH with a corresponding DAI value and at least one PUSCH without a corresponding DAI value; determining whether there is an overlapping PUCCH; selecting one of the plurality of PUSCHs according to the plurality of the predefined rules; and multiplexing the HARQ-ACK on the selected PUSCH.

Example 10 is the baseband processor of example 9 that may optionally include that the operations further comprise: multiplexing the HARQ-ACK on the PUSCH when the PUSCH does not have a corresponding DAI value.

Example 11 is the baseband processor of example 9 that may optionally include that the operations further comprise: multiplexing the HARQ-ACK on the PUSCH when the PUSCH has a corresponding UL-TAI and if UL-TDAI is not equal to four or DL-cDAI equals UL-TDAI.

Example 12 is the baseband processor of example 9 that may optionally include that the operations further comprise: multiplexing the HARQ-ACK on the PUSCH with a corresponding T-DAI value when the T-DAI value not equal to four.

Example 13 is a method of communication by a wireless user equipment (UE) in a communication network, the method comprising: determining that transmission of plurality of physical uplink shared channels (PUSCHs) are scheduled, wherein the transmission of the plurality of PUSCHs overlap with transmission of an uplink control information (UCI); determining at most one of the plurality of PUSCHs on to which the UCI is multiplexed based on a Downlink Assignment Index (DAI) value, wherein the plurality of PUSCHs are set with no more than one PUSCH having the DAI value not equal to four; and transmitting the determined PUSCH with the UCI multiplexed on it.

Example 14 is the method of example 13 that may optionally include that the operations further comprise: determining that the PUSCH is scheduled by a downlink control information (DCI) format with the DAI value not equal to four; multiplexing a Hybrid Automatic Repeat Request-Acknowledgement (HARQ-ACK) on the PUSCH; and determining a codebook size of the HARQ-ACK based on the DAI value.

Example 15 is the method of example 13 that may optionally include that the operations further comprise: determining a presence of the DAI value for each of the plurality of overlapping PUSCHs; determining that each of the PUSCHs having the DAI value equal to four or no corresponding DAI; determining that the plurality of PUSCHs overlap with a PUCCH with a HARQ-ACK; selecting one of the plurality of PUSCHs according to a plurality of predefined rules; multiplexing the HARQ-ACK on the PUSCH; and determining a codebook size of the HARQ-ACK based on the DAI value.

Example 16 is the method of example 15 that may optionally include that the operations further comprise: determining that the plurality of PUSCHs are not overlapped with a PUCCH with a HARQ-ACK; and not multiplexing the HARQ-ACK on any of the PUSCHs.

Example 17 is the method of example 13 that may optionally include that the operations further comprise: determining that all the PUSCHs have an uplink (UL)-Total DAI (TDAI) equal to four and there is an overlapping PUCCH with a downlink (DL)-Counter DAI (cDAI) equals uplink (UL)-Total DAI (TDAI); selecting one of the plurality of PUSCHs according to a plurality of predefined rules; multiplexing the HARQ-ACK on the selected PUSCH; and determining a codebook size of the HARQ-ACK based on the DAI value.

Example 18 is the method of example 17 that may optionally include that the operations further comprise: determining a HARQ-ACK codebook based on a codebook constructed for the slot; and dropping the PUCCH for the HARQ-ACK in the slot.

Example 19 is the method of example 17 that may optionally include that the slot comprises no more than one PUCCH with the HARQ-ACK.

Example 20 is the method of example 13 that may optionally include that the operations further comprise: determining that the plurality of PUSCHs do not have a corresponding DAI value; determining that the PUSCHs are overlapped with a PUCCH with the HARQ-ACK; selecting one of the plurality of PUSCHs s according to the plurality of predefined rules; and multiplexing the HARQ-ACK on the selected PUSCH.

Example 21 is the method of example 13 that may optionally include that the operations further comprise: determining whether there is at least one PUSCH with a corresponding DAI value and at least one PUSCH without a corresponding DAI value; determining whether there is an overlapping PUCCH; selecting one of the plurality of PUSCHs according to the plurality of the predefined rules; and multiplexing the HARQ-ACK on the selected PUSCH.

Example 22 is the method of example 21 that may optionally include that the operations further comprise: multiplexing the HARQ-ACK on the PUSCH when the PUSCH does not have a corresponding DAI value.

Example 23 is the method of example 21 that may optionally include that the operations further comprise: multiplexing the HARQ-ACK on the PUSCH when the PUSCH has a corresponding UL-TAI and if UL-TDAI is not equal to four or DL-cDAI equals UL-TDAI.

Example 24 is the method of example 21 that may optionally include that the operations further comprise: multiplexing the HARQ-ACK on the PUSCH with a corresponding T-DAI value when the T-DAI value not equal to four.

Example 25 is one or more non-transitory computer readable storage media having instructions stored thereupon which, when executed by a system having at least a processor and a memory therein, cause the system to perform operations of any one of examples 13-24.

Example 26 is a user equipment (UE) device comprising: at least one antenna; at least one radio, wherein the at least one radio is configured to communicate with a second UE of a communication network using the at least one antenna; and at least one processor coupled to the at least one radio, wherein the at least one processor is configured to perform operations comprising: determining that transmission of plurality of physical uplink shared channels (PUSCHs) are scheduled, wherein the transmission of the plurality of PUSCHs overlap with transmission of an uplink control information (UCI); determining at most one of the plurality of PUSCHs on to which the UCI is multiplexed based on a Downlink Assignment Index (DAI) value, wherein the plurality of PUSCHs are set with no more than one PUSCH having the DAI value not equal to four; and transmitting the determined PUSCH with the UCI multiplexed on it.

Example 27 is the UE of example 25 that may optionally include that the at least one processor is configured to perform the operations set forth in any one of examples 14-24.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A baseband processor of a wireless equipment (UE) configured to perform operations comprising:
    determining that transmission of plurality of physical uplink shared channels (PUSCHs) are scheduled, wherein the transmission of the plurality of PUSCHs overlap with transmission of an uplink control information (UCI);
    determining at most one of the plurality of PUSCHs on to which the UCI is multiplexed based on a Downlink Assignment Index (DAI) value, wherein the plurality of PUSCHs are set with no more than one PUSCH having the DAI value not equal to four; and
    transmitting the determined PUSCH with the UCI multiplexed on it.

2. The baseband processor of claim 1, wherein the operations further comprise:
    determining that the PUSCH is scheduled by a downlink control information (DCI) format with the DAI value not equal to four;
    multiplexing a Hybrid Automatic Repeat Request-Acknowledgement (HARQ-ACK) on the PUSCH; and
    determining a codebook size of the HARQ-ACK based on the DAI value.

3. The baseband processor of claim 1, wherein the operations further comprise:
    determining a presence of the DAI value for each of the plurality of overlapping PUSCHs;
    determining that each of the PUSCHs having the DAI value equal to four or no corresponding DAI;
    determining that the plurality of PUSCHs overlap with a PUCCH with a HARQ-ACK;
    selecting one of the plurality of PUSCHs according to a plurality of predefined rules;
    multiplexing the HARQ-ACK on the PUSCH; and
    determining a codebook size of the HARQ-ACK based on the DAI value.

4. The baseband processor of claim 3, wherein the operations further comprise:
    determining that the plurality of PUSCHs are not overlapped with a PUCCH with a HARQ-ACK; and
    not multiplexing the HARQ-ACK on any of the PUSCHs.

5. The baseband processor of claim 1, wherein the operations further comprise:
    determining that all the PUSCHs have an uplink (UL)-Total DAI (TDAI) equal to four and there is an overlapping PUCCH with a downlink (DL)-Counter DAI (cDAI) equals uplink (UL)-Total DAI (TDAI);
    selecting one of the plurality of PUSCHs according to a plurality of predefined rules;
    multiplexing the HARQ-ACK on the selected PUSCH; and
    determining a codebook size of the HARQ-ACK based on the DAI value.

6. The baseband processor of claim 5, wherein the operations further comprise:
    determining a HARQ-ACK codebook based on a codebook constructed for a slot; and
    dropping the PUCCH for the HARQ-ACK in the slot.

7. The baseband processor of claim 5, wherein a slot comprises no more than one PUCCH with the HARQ-ACK.

8. The baseband processor of claim 1, wherein the operations further comprise:
    determining that the plurality of PUSCHs do not have a corresponding DAI value;
    determining that the PUSCHs are overlapped with a PUCCH with the HARQ-ACK;
    selecting one of the plurality of PUSCHs s according to the plurality of predefined rules; and
    multiplexing the HARQ-ACK on the selected PUSCH.

9. The baseband processor of claim 1, wherein the operations further comprise:
    determining whether there is at least one PUSCH with a corresponding DAI value and at least one PUSCH without a corresponding DAI value;
    determining whether there is an overlapping PUCCH;
    selecting one of the plurality of PUSCHs according to the plurality of the predefined rules; and
    multiplexing the HARQ-ACK on the selected PUSCH.

10. The baseband processor of claim 9, wherein the operations further comprise:
    multiplexing the HARQ-ACK on the PUSCH when the PUSCH does not have a corresponding DAI value.

11. The baseband processor of claim 9, wherein the operations further comprise:
    multiplexing the HARQ-ACK on the PUSCH when the PUSCH has a corresponding UL-TAI and if UL-TDAI is not equal to four or DL-cDAI equals UL-TDAI.

12. The baseband processor of claim 9, wherein the operations further comprise:
    multiplexing the HARQ-ACK on the PUSCH with a corresponding T-DAI value when the T-DAI value not equal to four.

13. A method of communication by a wireless user equipment (UE) in a communication network, the method comprising:
    determining that transmission of plurality of physical uplink shared channels (PUSCHs) are scheduled, wherein the transmission of the plurality of PUSCHs overlap with transmission of an uplink control information (UCI);
    determining at most one of the plurality of PUSCHs on to which the UCI is multiplexed based on a Downlink Assignment Index (DAI) value, wherein the plurality of PUSCHs are set with no more than one PUSCH having the DAI value not equal to four; and transmitting the determined PUSCH with the UCI multiplexed on it.

14. The method of claim 13, wherein the operations further comprise:

determining that the PUSCH is scheduled by a downlink control information (DCI) format with the DAI value not equal to four;

multiplexing a Hybrid Automatic Repeat Request-Acknowledgement (HARQ-ACK) on the PUSCH; and determining a codebook size of the HARQ-ACK based on the DAI value.

15. The method of claim 13, wherein the operations further comprise:

determining a presence of the DAI value for each of the plurality of overlapping PUSCHs; and determining that each of the PUSCHs having the DAI value equal to four or no corresponding DAI;

determining that the plurality of PUSCHs overlap with a PUCCH with a HARQ-ACK;

selecting one of the plurality of PUSCHs according to a plurality of predefined rules;

multiplexing the HARQ-ACK on the PUSCH; and determining a codebook size of the HARQ-ACK based on the DAI value.

16. The method of claim 15, wherein the operations further comprise:

determining that the plurality of PUSCHs are not overlapped with a PUCCH with a HARQ-ACK; and not multiplexing the HARQ-ACK on any of the PUSCHs.

17. The method of claim 13, wherein the operations further comprise:

determining that all the PUSCHs have an uplink (UL)-Total DAI (TDAI) equal to four and there is an overlapping PUCCH with a downlink (DL)-Counter DAI (cDAI) equals uplink (UL)-Total DAI (TDAI);

selecting one of the plurality of PUSCHs according to a plurality of predefined rules;

multiplexing the HARQ-ACK on the selected PUSCH; and determining a codebook size of the HARQ-ACK based on the DAI value.

18. The method of claim 17, wherein the operations further comprise:

determining a HARQ-ACK codebook based on a codebook constructed for the slot; and dropping the PUCCH for the HARQ-ACK in a slot.

19. The method of claim 17, wherein a slot comprises no more than one PUCCH with the HARQ-ACK.

20. A user equipment (UE) device comprising:

at least one antenna;

at least one radio, wherein the at least one radio is configured to communicate with a second UE device of a communication network using the at least one antenna; and at least one processor coupled to the at least one radio, wherein the at least one processor is configured to perform operations comprising:

determining that transmission of plurality of physical uplink shared channels (PUSCHs) are scheduled, wherein the transmission of the plurality of PUSCHs overlap with transmission of an uplink control information (UCI);

determining at most one of the plurality of PUSCHs on to which the UCI is multiplexed based on a Downlink Assignment Index (DAI) value, wherein the plurality of PUSCHs are set with no more than one PUSCH having the DAI value not equal to four; and transmitting the determined PUSCH with the UCI multiplexed on it.

* * * * *